United States Patent [19]

Kawada et al.

[11] Patent Number: 5,463,503
[45] Date of Patent: Oct. 31, 1995

[54] METHOD FOR PRODUCING A POLYGON MIRROR

[75] Inventors: Sunao Kawada; Masataka Inagi; Yoshio Iwamura; Toyotsugu Itoh; Takayoshi Hashimoto, all of Hachioji, Japan

[73] Assignee: Konica Corporation, Tokyo, Japan

[21] Appl. No.: 163,036

[22] Filed: Dec. 6, 1993

[30] Foreign Application Priority Data

Dec. 25, 1992 [JP] Japan ........................ 4-357732

[51] Int. Cl.⁶ ...................... G02B 5/08; B23B 3/00
[52] U.S. Cl. .................. 359/838; 359/850; 359/856; 407/119; 82/1.11
[58] Field of Search .................... 359/218, 838, 359/850, 856; 407/119; 82/1.11

[56] References Cited

U.S. PATENT DOCUMENTS 5,003,851  4/1991  Kawada et al. ............... 82/1.11
5,022,797  6/1991  Sawa et al. ................. 407/119

Primary Examiner—Paul M. Dzierzynski
Assistant Examiner—Mohammad Y. Sikder
Attorney, Agent, or Firm—Frishauf, Holtz, Goodman, Langer & Chick

[57] ABSTRACT

A polygon mirror is produced using a diamond tool. The diamond tool includes a major cutting edge and an end cutting edge. The major cutting edge is formed straight by a rake face and a side flank, the major cutting edge having a first side and a second side. The end cutting edge is formed straight by the rake face and a front flank, the end cutting edge having a third side. A microscopic cutting edge is arranged between the second side and the third side so that the major cutting edge and the microscopic cutting edge together create a first corner at the second side, and the end cutting edge and the microscopic cutting edge create a second corner at the third side. The rake face is inclined downward from the second corner to the first side. The microscopic cutting edge is between 0.1 mm and 0.4 mm in a direction of the end cutting edge. The microscopic cutting edge at the first corner is swept back by an amount between 0.21 μm and 0.6 μm from an extended line of the end cutting edge in a direction perpendicular to the extended line. The material being operated on by the diamond cutting tool is held and fed relatively to the diamond tool so that the material is cut with the major cutting edge, is thereafter microscopically cut with the microscope cutting edge, and is thereafter burnish-finished with the end cutting edge.

6 Claims, 6 Drawing Sheets

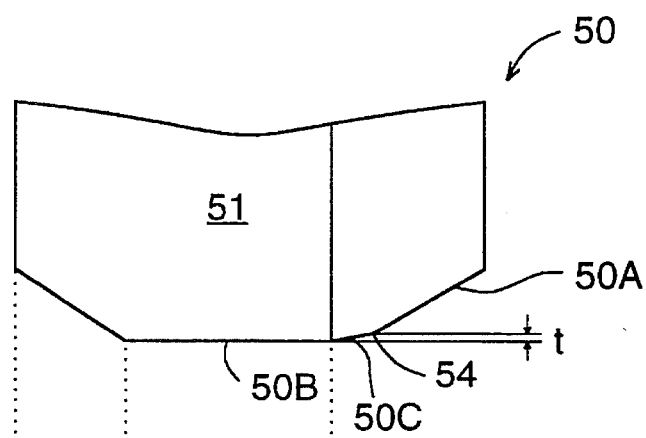
FIG. 4 (b)
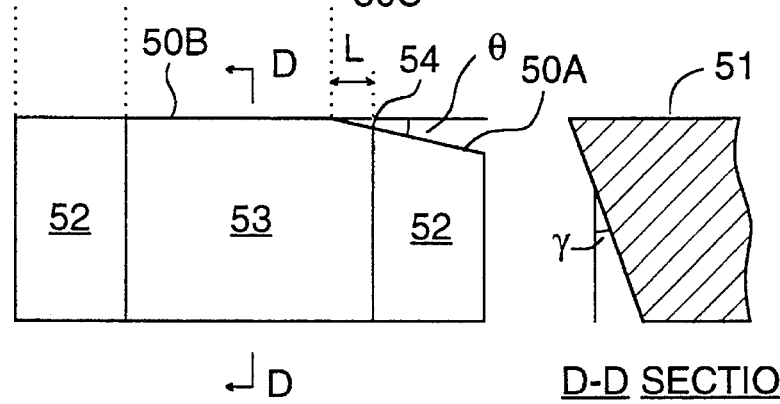
FIG. 4 (a)
D-D SECTION
FIG. 4 (c)

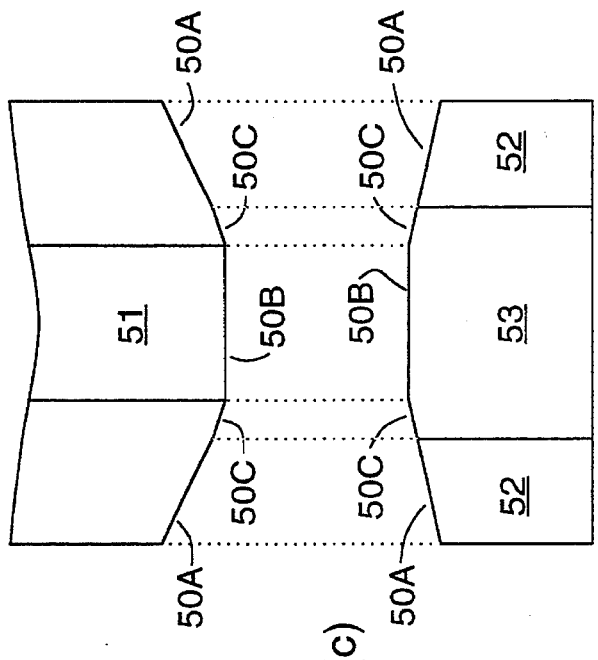
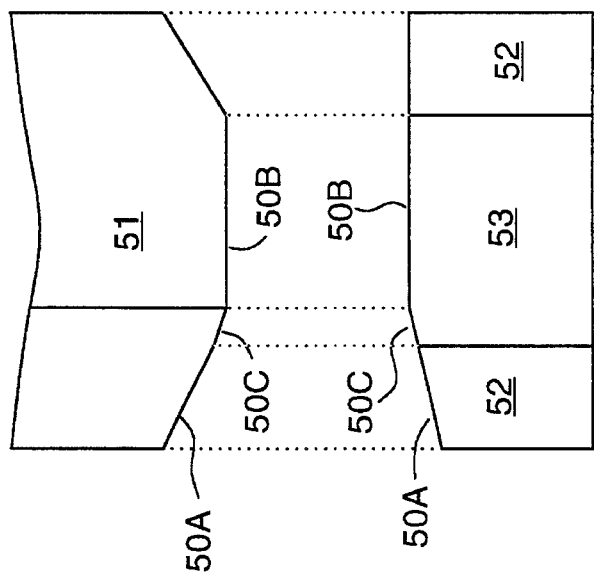

FIG. 8 (a) PRIOR ART
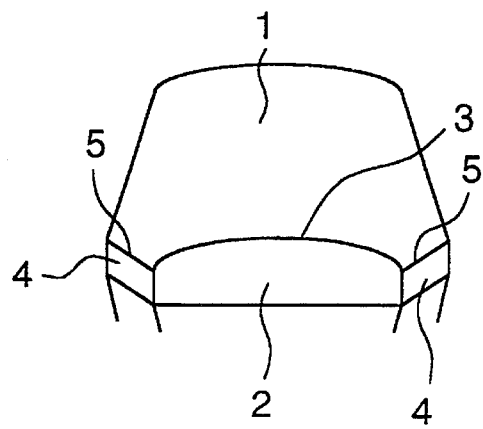
FIG. 8 (b) PRIOR ART
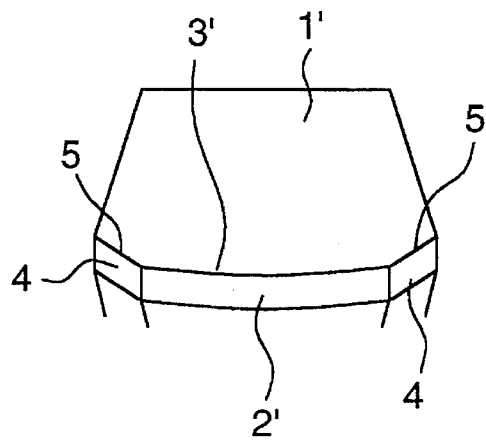
FIG. 9 PRIOR ART
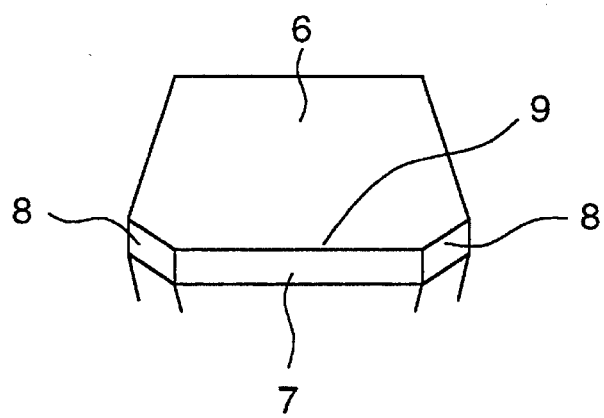
FIG. 10 PRIOR ART
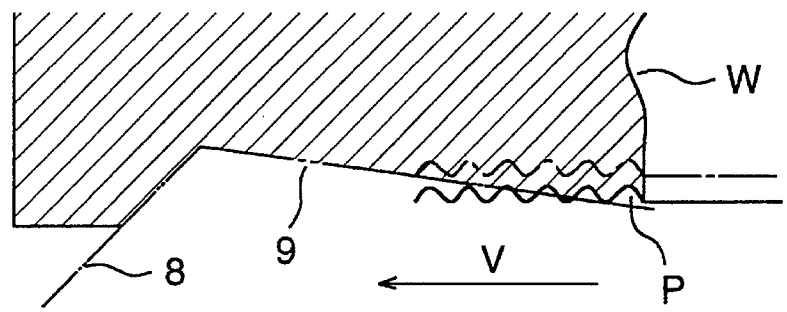

METHOD FOR PRODUCING A POLYGON MIRROR

BACKGROUND OF THE INVENTION

The present invention relates to a method for producing a polygonal mirror.

In an apparatus employing a laser beam such as, for example, a laser printer, a polygonal mirror is used as a means to use a laser beam emitted from a laser beam emitting source for scanning through a deflection.

The polygonal mirror is a polygonal plate-shaped object, and a reflection surface is provided on each side of the polygonal mirror. When the polygonal mirror is rotated so that each reflection surface moving on a circular motion basis may receive a laser beam, the laser beam is deflected for scanning.

There is recently used a method wherein a reflection surface of a polygonal mirror is formed by mirror-machining a metallic material composed of an aluminum alloy or the like with a diamond tool.

FIG. 8 is a schematic diagram showing a shape of a diamond tip on a diamond tool.

A diamond tip shown in FIG. 8 (a) is one wherein semicylindrical rake face 1 is formed, and circular-arc-shaped end cutting edge 3 is formed by both rake face 1 and front flank 2 (hereinafter referred to also as "one with R-shaped rake face"), while a diamond shown in FIG. 8 (b) is one wherein circular-arc-shaped end cutting edge 3' is formed by both flat rake face 1' and curved front flank 2' (hereinafter referred to also as "one with R-shaped nose"). Incidentally, in FIG. 8, the numeral 4 represents a side flank and the numeral 5 represents major cutting edge.

When obtaining a reflection surface of a polygonal mirror by the use of the diamond tools mentioned above, a metallic material is machined by major cutting edge 5 first. Then, the machined surface is subjected to burnishing by means of end cutting edge 3 (3') to remove scratches or the like for machining a mirror-like surface.

However, with regard to a cutting tool with an R-shaped rake face and a cutting tool with an R-shaped nose, it is difficult to machine accurately their cutting edges. Despite an endeavor to make cutting tools to be in the same shape in production, errors in shape can not be avoided, resulting in occurrence of deviation in shape. Namely, it is actually difficult to grind a monocrystal diamond which is anisotropic in crystal accurately to a shape of a semicylindrical surface or a curved surface, and it is not possible to form a shape of a circular arc of major cutting edge 3 (3') highly accurately, resulting in defects such as fine chipping or a waviness on a cutting edge formed which tend to occur. When machining a reflection surface of a polygonal mirror using a cutting tool having the defects mentioned above, fine wariness and unevenness are caused on the machined surface, bringing occurrence of scatted light and a fall of reflectance which greatly deteriorates efficiency of the polygonal mirror, though mirror surface seems to have been obtained superficially. A method for producing a polygonal mirror by the use of cutting tools having an R-shaped rake face and an R-shaped nose can not be free from occurrence of defective products and from a fall of production efficiency as stated above. The method, therefore, is far from an appropriate one for producing a polygonal mirror.

On the other hand, inventors of the invention studied how to mirror-finish a reflection surface of a polygonal mirror using a diamond tool wherein both rake face 6 and front flank 7 of a diamond tip are flat and both major cutting edge 8 and end cutting edge 9 are straight in shape (hereinafter referred to also as "flat edge form") as shown in FIG. 9.

Mirror-finishing by means of a cutting tool of a type of the flat edge form is carried out as follows.

First, the diamond tool is brought into contact with a metal material on which a reflection surface is to be formed. In this case, the diamond tool is caused to contact so that major cutting edge may be inclined by a predetermined angle (entering angle) from a feed direction for the diamond tool and end cutting edge may be in substantially parallel with the feed direction for the diamond tool.

Then, as shown in FIG. 10, the diamond tool is fed with a constant pitch (feed direction is shown with "arrow v" in FIG. 10). Thereby, metal material W is cut by major cutting edge 8. On the surface of the metal material W cut by major cutting edge 8, there occurs scratches p or the like, and the surface where major cutting edge 8 has just passed is compressed and lifted (a level on the surface where major cutting edge 8 has just passed is shown with one-dot chain lines). The surface thus compressed is restored by the elasticity of the metal material W (a level on the surface in restoration is shown with solid lines in the figure), and scratches p and the like existing on the surface are burnished or removed by the succeeding end cutting edge 9. Owing to such burnishing by means of end cutting edge 9, a mirror surface can be formed.

Since major cutting edge and end cutting edge of a diamond tool with flat cutting edges as those mentioned above are straight in form, it is possible to consider crystal orientation when grinding the cutting edges. In a diamond tool with flat cutting edges thus obtained, an error in its shape is small and its cutting edges are free from defects of cutting edge chipping and waviness to be accurate in shape. Therefore, it is possible to control, to a certain extent, occurrence of defective products caused by deviations in accuracy of a cutting tool and a fall of production efficiency.

However, when obtaining a reflection surface of a polygonal mirror by the use of a cutting tool with flat cutting edges, a thickness of a chip produced through cutting by means of a major cutting edge is greatly different from that of a chip produced through burnishing by means of end cutting edge. Therefore, chips produced in the course of burnishing are broken into pieces to become cutting powder which enters between a metallic material and the cutting tool, causing sometimes scratches. In this case, it is not possible to form a mirror surface stably.

The invention has been achieved in view of the circumstances mentioned above, and its object is to provide a method for producing stably polygonal mirrors having no scattering and having high reflectance wherein efficiencies of cutting and burnishing can be kept constant.

SUMMARY OF THE INVENTION

A method for producing a polygonal mirror of the invention is represented by the method for producing a polygonal mirror in which a reflection surface is mirror-machined by feeding a diamond tool having on its shank a diamond tip while keeping the diamond tool to be in contact with a metallic material, wherein the diamond tip has a straight major cutting edge formed by both rake face and a side flank meeting each other and has a straight end cutting edge formed by both rake face and a front flank meeting each other, rake face viewed from the side of the front flank is inclined so that major cutting edge side may be lowered against the side thereof from the position that is away from a cutting edge corner toward end cutting edge side by 0.1–0.4 mm, and the cutting edge corner viewed from rake face side is retreated within a range of 0.1 μm–0.6 μm due to an angle of the inclination of rake face and relief angle of the front flank, thus a microscopic cutting edge connecting the retreated cutting edge corner and one end of end cutting edge is formed, and thereby machining of cutting by means of major cutting edge, machining of microscopic cutting by means of the microscopic cutting edge and machining of burnishing by means of end cutting edge can be performed in succession continuously, while the diamond tool is being fed.

It is preferable to set a diamond tool so that an angle between the direction for feeding the diamond tool and the direction of extending of a microscopic cutting edge may be within the range of 0.01°–0.2° when it is viewed from rake face.

(1) Since major cutting edge and end cutting edge are straight in shape, a cutting tool itself has a small error in terms of shape and thereby has a cutting edge that is free from defects and is highly accurate. Therefore, occurrence of defective products caused by deviations in accuracy of a cutting tool used can be controlled and productivity of polygonal mirrors can be improved.

(2) Since an edge portion of rake face is inclined in a way that major cutting edge side is lowered, a cutting edge corner is retreated due to an angle of the inclination and relief angle of a front flank, and a microscopic cutting edge is formed between major cutting edge and end cutting edge.

Since machining of cutting by means of major cutting edge, machining of microscopic cutting by means of the microscopic cutting edge and machining of burnishing by means of end cutting edge can be performed in succession continuously, while the diamond tool is being fed, mirror-finishing for the reflection surface of a polygonal mirror can be curried out stably.

In other words, a thick chip generated by major cutting edge and an extremely thin chip generated by end cutting edge are connected continuously through a chip generated by the microscopic cutting edge. Therefore, it is possible to prevent from scratches or the like caused by cutting powder which contains crushed chips and enters between a metallic material and a cutting tool.

Since machining of microscopic cutting by means of a microscopic cutting edge is carried out before burnishing by means of end cutting edge, a load (cutting force) on end cutting edge is extremely small and wear and damage of end cutting edge are lessened, resulting in life extension of a cutting tool and an improvement in productivity.

With respect to a polygonal mirror produced under the preferable conditions mentioned above, its reflection surface does not scatter light and has a high reflectance naturally.

(3) By restricting both a inclined distance of rake face and a retreated distance of a cutting edge corner, it is possible to produce a polygonal mirror having a reflection surface which is more preferable, as is apparent from the example described later.

BRIEF DESCRIPTION OF THE DRAWINGS

FIGS. 4(a)–4(c) respectively represent an illustration showing the shape of a tip portion of a diamond tip.

FIGS. 5(a)–5(d) respectively represent an illustration showing the shape of a tip portion of a diamond tip.

FIGS. 8(a) and 8(b) respectively represent a schematic diagram showing the shape of a diamond tip in a conventional diamond tool.

FIG. 9 is a schematic diagram showing the shape of a diamond tip of a flat cutting edge shape.

FIG. 10 is an illustration showing the process of mirror-finishing for a reflection surface obtained by a diamond tip of a flat cutting edge shape.

DETAILED DESCRIPTION OF THE INVENTION

Figure 1:
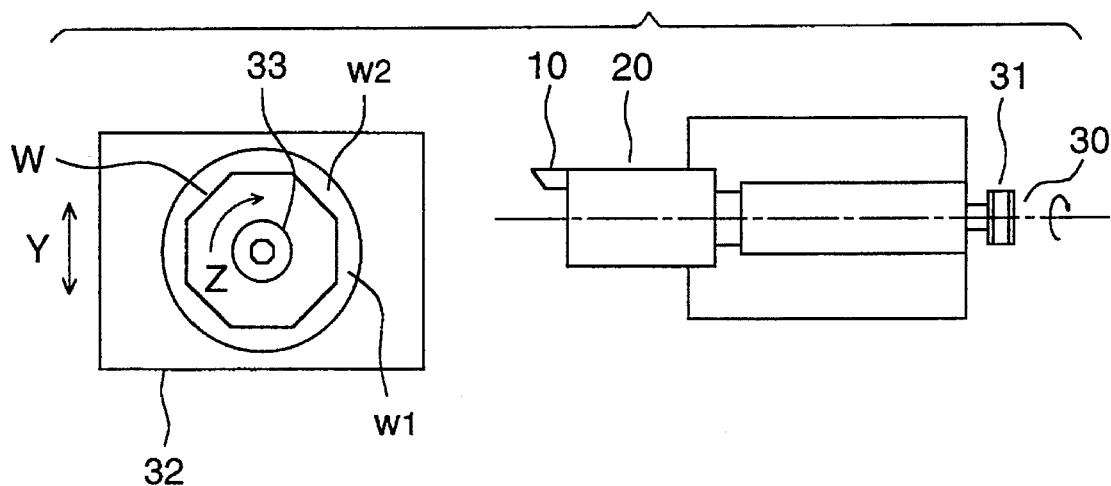
FIGS. 1(a) and 1(b) represent respectively an illustration showing the outline of a cutting machine used in a method for producing related to the invention.
Figure 1:
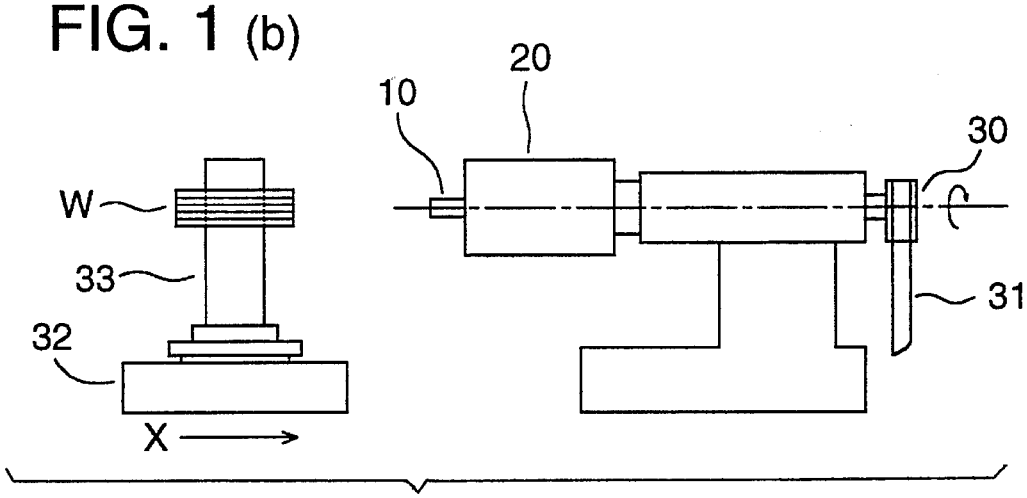

Examples of the invention will be explained as follows, referring to the drawings, but the invention is not limited to the examples.

An outline of a cutting machine used in a method for producing related to the invention is shown in FIG. 1 wherein FIG. 1(a) represents a plan view and FIG. 1(b) represents a front view.

In the figure, the numeral 10 is a diamond tool holding a diamond tip in the specific shape, the numeral 20 is a spindle on which the diamond tool 10 is affixed, the numeral 30 is a pulley affixed on a rotary shaft of the spindle 20 and the numeral 31 is a belt. The spindle 20 is rotated by an unillustrated motor through the belt 31 and the pulley 30.

On the other hand, W represents a metallic material (having 8 reflection surfaces) from which a polygonal mirror is obtained. A plurality of the metallic materials W are stacked and held on work-holder 33 on movable table 32. The movable table 32 is capable of moving both in the cross feed direction (shown with arrowed mark X in the figure) and in the feed direction (shown with arrowed mark Y in the figure).

Mirror-finish machining by the use of the cutting machine is carried out as follows.

Figure 2:
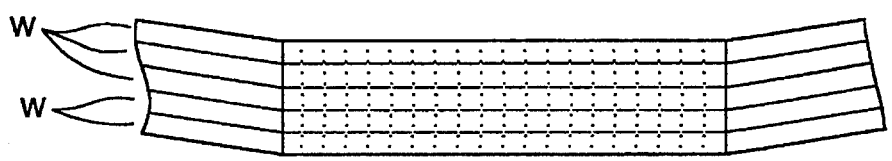
FIG. 2 is an illustration showing schematically a motion of a diamond tool on a surface of a metallic material.

First, the movable table 32 is moved in the X-direction so that the diamond tip 10 may be brought into contact with one surface w1 of the metallic material W. Then, the movable table 32 is fed in the Y-direction while the spindle 20 is rotated. Thus, one surface w1 is machined on a mirror-finishing basis. FIG. 2 is an illustration showing schematically the motion of a diamond tool.

When mirror-finish machining on one surface w1 of the metallic material W is completed, the metallic material W is rotated in the Z-direction by 45 degrees together with work-holder 33, and another surface w2 is machined on a mirror-finishing basis in the same manner. After that, each surface of the metallic material W is machined in succession on a mirror-finishing basis.

A method for producing related to the invention is characterized in that a diamond tool having thereon a diamond tip in the specific shape is used in machining for forming a mirror surface.

Shapes of diamond tools used in the invention will be explained as follows.

Figure 3:
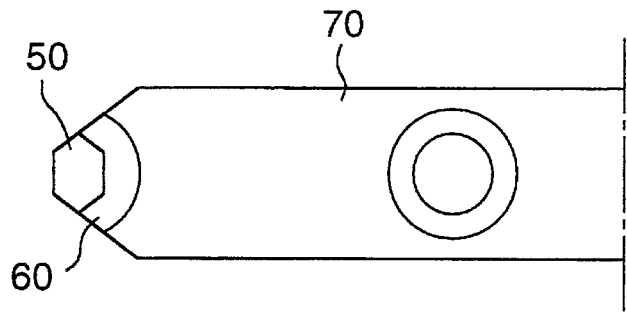
FIGS. 3(a)–3(c) respectively represent a schematic illustration of a diamond tool used in a method of the invention.
Figure 3:
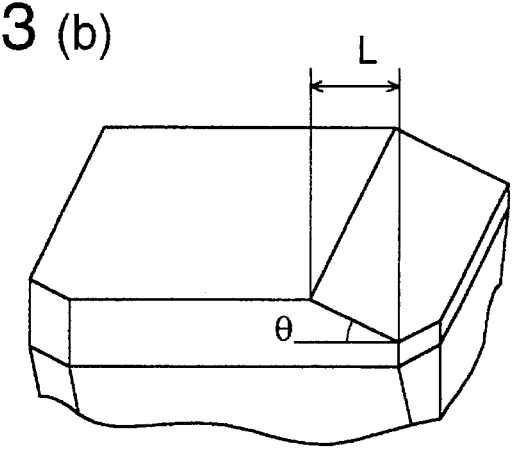
Figure 3:
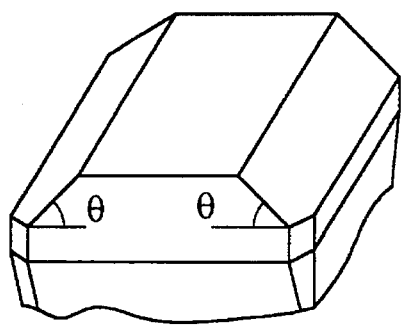

FIGS. 3(a)–3(b) respectively represent a schematic illustration of a diamond tool used in the method of the invention.

In the diamond tool, diamond tip 50 is affixed on insert 60 that is made of cemented carbide, or the like and the insert 60 is cemented on the tip of shank 70.

FIG. 4 is an illustration showing the shape of a tip portion of the diamond tip 50. FIG. 4(a), 4(b) and 4(c) represent respectively a front view (viewed from the front flank side), a top view (viewed from rake face side) and a side sectional view (taken on D—D line in FIG. 4(a)).

The diamond tip 50 is provided with major cutting edge 50A formed by both rake face 51 and side flank 52 which meet each other. The diamond tip 50 is also provided with end cutting edge 50B formed by both rake face 51 and front flank 53 which meet each other. Each of major cutting edge 50A and the end cutting edge 50B is a cutting edge that is straight in shape.

As shown in FIG. 4(a), rake face 51 is inclined on its one end side by inclination angle θ toward major cutting edge 50A side from the position being away toward end cutting edge 50B side from cutting edge corner 54 by distance L. On the other hand, as shown in FIG. 4(c), front flank 53 has relief angle. Inclination angle θ of the rake face 51 and relief angle of the front flank 53 cause the cutting edge corner 54 to be swept back by certain amount t (t≈L·tanθ·tanγ) as shown in FIG. 4(b). Between the cutting edge corner 54 and one end of end cutting edge 50B, there is formed microscopic cutting edge 50C.

Incidentally, an inclination on rake face may be formed at the other end as shown in FIGS. 5(a) and 5(b). A direction for feeding a tool determines the side for inclination. Further, as shown in FIGS. 5(c) and 5(d), inclinations may also be provided on both end sides of rake face to form a cutting edge wherein "major cutting edge 50A, microscopic cutting edge 50C, end cutting edge 50B, microscopic cutting edge 50C and major cutting edge 50A" are formed in succession.

By the use of the diamond tool having a diamond tip in the above-mentioned shape, a reflection surface is machined on a mirror-finishing basis as follows.

Figure 6:
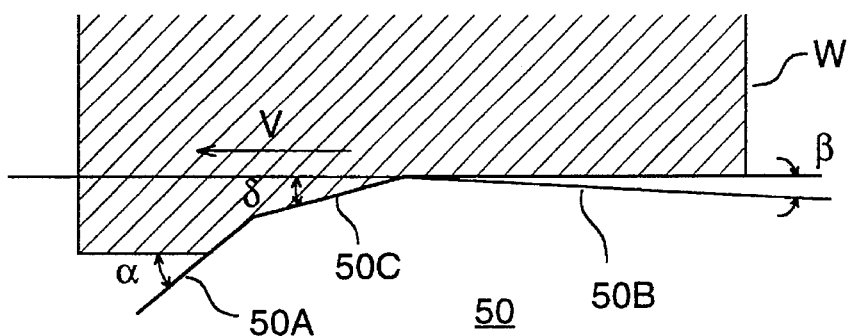
FIGS. 6(a) and 6(b) respectively represent an illustration showing the process of mirror-finishing for a reflection surface obtained by a diamond tool used in the invention.
Figure 6:
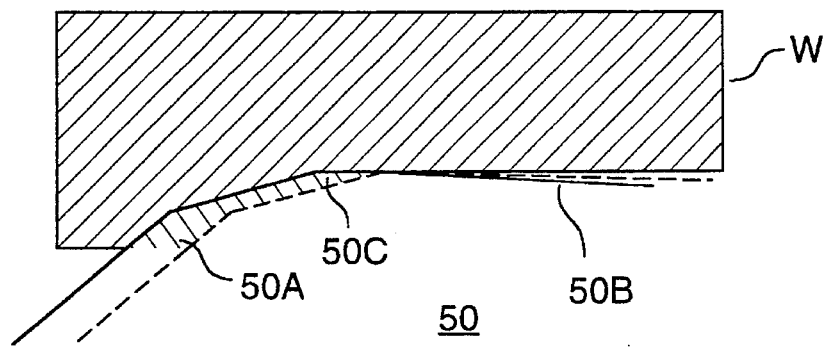

(1) Diamond tool 50 is brought into contact with metallic material W (see FIG. 6(a)). In this case, the diamond tool 50 is brought into contact so that major cutting edge 50A may have certain entering angle α and end cutting edge 50B may have certain angle β both on feed direction V. In this case, when metallic material W is an aluminum alloy, entering angle α of major cutting edge 50A is normally set within an angle range of 10°–30°, and touching angle β of end cutting edge 50B is normally set within a range of 0°–0.1°.

Further, in a method of the invention, it is preferable that angle δ formed between the feed direction V and microscopic cutting edge 50C is set to 0.01°–0.2°, and especially preferable angle is in the vicinity of 0.08°.

(2) The tool is fed at a constant pitch while the setting conditions mentioned above are kept (see FIG. 6 (b)). Owing to this, processes to cut metallic material W and to form a mirror surface are considered to be as follows. First, the major cutting edge 50A machines the metallic material W by a length equivalent to the feed per revolution. The surface (machined surface) of the metallic material W machined by the major cutting edge 50A is subjected to microscopic machining made by microscopic cutting edge 50C that follows major cutting edge 50A, and thereby, is regulated to a certain extent. Thus, scratches or the like remain slightly on the surface which has been subjected to microscopic machining. These scratches or the like are completely removed through burnishing made by end cutting edge 50B that follows the microscopic cutting edge 50C, thus, a mirror surface can be formed.

As stated above, machining of cutting by means of the major cutting edge 50A, machining of microscopic cutting by means of the microscopic cutting edge 50C and machining of burnishing by means of end cutting edge 50B can be performed in succession continuously while these cutting edges are being fed. Therefore, mirror-machining of a reflection surface of a polygonal mirror can be carried out stably, and it is possible to obtain a reflection surface which is mirror-machined with a high precision.

When cutting and mirror-machining with a diamond tool having the cutting edge shape mentioned above, a thick chip generated by major cutting edge 50A and a thin chip generated by end cutting edge 50B are connected continuously through a chip generated by the microscopic cutting edge 50C, and scratches or the like caused by chip powder generated when chips are broken into pieces during burnishing by means of end cutting edge 50B and enters between a metallic material and the cutting tool are prevented from remaining, resulting in stable cutting. On the contrary, when cutting edge corner 54 is not retreated and no microscopic cutting edge exists, chips caused by the end cutting edge 50B are broken into pieces and are not connected continuously, resulting in occurrence of scratches caused by those chips caught between the tool and a work.

Experiment Example 1

In the method for producing related to the invention, when a contact length of end cutting edge and a retreating amount of a cutting edge corner are changed, processes for forming chips and a machined surface are changed delicately. Therefore, there is a fear that conditions on the machined surface will fluctuate. When a microscopic cutting edge is too long, in particular, slight waviness appears on the machined surface, causing a problem of occurrence of scattering light or the like.

For the purpose of achieving an appropriate condition of a mirror surface for the reflection surface of a polygonal mirror, therefore, inventors of the invention made experiments to obtain preferable ranges with respect to inclined length L (that is nearly the same as the length of the microscopic cutting edge) of rake face viewed from the front flank side and retreating amount t of the cutting edge corner 54 viewed from rake face side.

Diamond tools, metallic materials and machining conditions used in the experiments are shown below.

Figure 7:
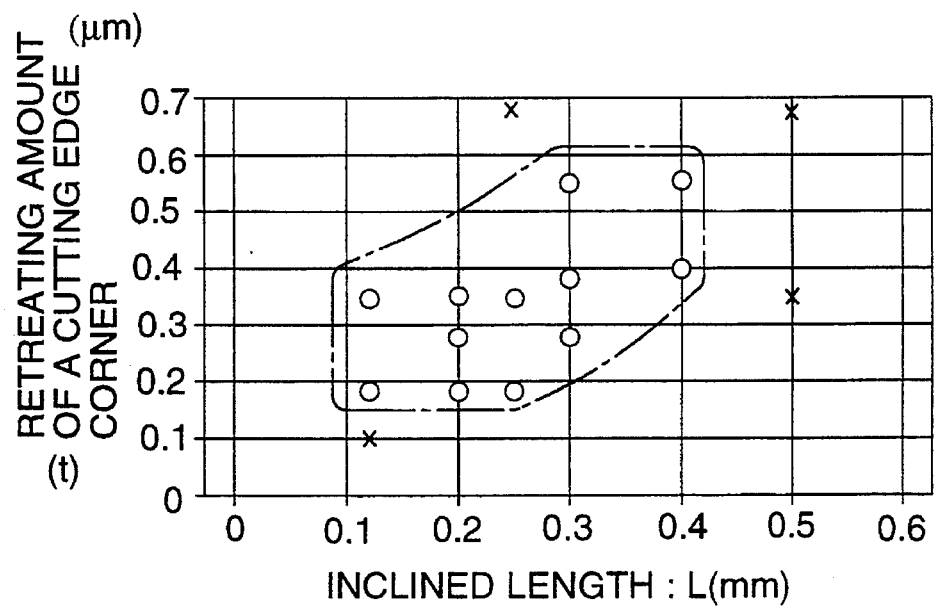
FIG. 7 is a graph showing the test results.

(1) Diamond tools: Diamond tool having a diamond tip with a shape shown in FIG. 4 (Tools having front relief angle γ of 3° and having different inclined length L and swept back amount t (inclination angle θ) were prepared.)
(2) Metallic materials: Materials for polygonal mirrors (number of surfaces: 6 surfaces, width across flats: 40 mm, thickness: 6 mm, material: AL 5000 type)
(3) Tool setting conditions: Entering angle α=10°, contact angle β of end cutting edge =0.01°–0.03°, angle δ formed between microscopic cutting edge and feed direction =0.08°
(4) Cutting machine: Cutting machine shown in FIG. 1
(5) Cutting conditions: Rotational speed of 1500 r.p.m., feed rate of 0.01 mm/rev, cutting depth of 0.01 mm, cutting oil of white kerosene As stated above, diamond tools in plural kinds each having different inclined length L and different retreating amount t were used for mirror-machining, and a reflection surface of each formed polygonal mirror was irradiated by a laser beam. Evaluation was made by checking whether scattering took place in the reflected beam or not. The evaluation results are shown in FIG. 7. Incidentally, in the figure, "0" represents that no scattering was observed, and "x" represents that scattering was observed.

As understood from the results shown in FIG. 7, no occurrence of scattering is observed when inclined length L of rake face is within a range of 0.1–0.4 mm and swept back amount t of a cutting edge corner exceeds 0.1 μm and is not more than 0.6 μm.

The experiments mentioned above indicate that when inclined length L and retreating amount t are set within a range enclosed with chain lines in FIG. 7, it is possible to conduct stably the finish-machining that is free from occurrence of scattering to make the reflection surface of a polygonal mirror to be on a condition of a high quality mirror surface.

Especially, in the case of the central portion of the range mentioned above, namely when L is set to 0.25 mm and retreating amount t is set to 0.35 μm, it is possible to form the reflection surface having extremely excellent surface roughness and being free from scattering and highly accurate.

Incidentally, when the above-mentioned conditions are kept, both inclination angle θ of rake face and front relief angle γ may be selected arbitrarily.

Experiment Example 2

On the other hand, for the purpose of studying preferable setting conditions for setting a diamond tool to a metallic material, experiments were made for obtaining preferable ranges with respect to angle δ formed between feed direction V and microscopic cutting edge 50C.

Tools having the same composition as those used in Experiment 1 (those wherein inclined length L of cutting face and swept back amount t of cutting edge corner are within the preferable range mentioned above) were used, and the angle δ mentioned above was changed for setting of the tool, and mirror-machining for a polygonal mirror was conducted in the same manner as in Example 1. A reflection surface of each formed polygonal mirror was irradiated by a laser beam, and evaluation was made by checking whether scattering took place in the reflected beam or not. The evaluation results are shown in Table 1.

TABLE 1

| Angle δ (°) | Evaluation (Occurrence of scattering) |
| --- | --- |
| 0 | Observed |
| 0.02 | Not observed |
| 0.05 | Not observed |
| 0.08 | Not observed |
| 0.10 | Not observed |
| 0.12 | Not observed |
| 0.15 | Not observed |
| 0.18 | Not observed |
| 0.20 | Not observed |
| 0.22 | Observed |

As understood from the results shown in Table 1, it is preferable to set so that angle δ formed between feeding direction V and microscopic cutting edge 50C may be within a range of 0.01°–0.2°

Owing to the method for producing related to the invention, it is possible to improve productivity of a polygonal mirror because each of tools used in the method has an accurate cutting edge that is free from defects and thereby occurrence of defective products caused by deviations in accuracy of a tool can be reduced.

In addition, machining of cutting by means of major cutting edge, machining of microscopic cutting by means of the microscopic cutting edge and machining of burnishing by means of end cutting edge can be performed in succession continuously while the diamond tool is being fed. Therefore, mirror-machining of a reflection surface of a polygonal mirror can be performed stably. The reflection surface of the polygonal mirror produced under the preferable conditions mentioned above is free from scattering of light and has high reflectance.

What is claimed is:

1. A method for producing a polygonal mirror with a diamond tool, comprising the steps of:

(a) providing the diamond tool so that said diamond tool includes:

a major cutting edge which is formed straight by a rake face and a side flank, said major cutting edge having a first side and a second side;

an end cutting edge which is formed straight by said rake face and a front flank, said end cutting edge having a third side;

a microscopic cutting edge which is arranged between said second side and said third side so that said major cutting edge and said microscopic cutting edge together create a first corner at said second side, and said end cutting edge and said microscopic cutting edge together create a second corner at said third side;

wherein said rake face is inclined downward from said second corner to said first side for an angle θ; said microscopic cutting edge has a length L, within a range between about 0.1 mm and about 0.4 mm, in a direction of said end cutting edge; said microscopic cutting edge at said first corner has a swept back amount t, within a range exceeding 0.1 μm and not more than about 0.6 μm, from an extended line of said end cutting edge in a direction perpendicular to said extended line; a front relief angle γ of said front flank is 3°; and said angle θ, said length L, said swept back amount t, and said front relief angle γ satisfy an equation:

$$t \approx L \cdot \tan\theta \cdot \tan\gamma$$

(b) holding a material with a holding means; and (c) feeding said material by said holding means relative to said diamond tool while said material is in contact with said diamond tool so that said material is cut with said major cutting edge and is thereafter microscopically cut with said microscopic cutting edge, and is thereafter burnish-finished with said end cutting edge.

2. The method of claim 1, wherein an angle δ, between a plane defined by a moving direction of said diamond tool and an extended line of said microscopic cutting edge as viewed from said rake face, is between about 0.01° and 0.2°.

3. The method of claim 1, wherein an angle δ, between a plane defined by a moving direction of said diamond tool and an extended line of said microscopic cutting edge as viewed from said rake face is between 0.20° and 0.2°.

4. The method of claim 3, wherein said angle δ is about 0.08°.

5. The method of claim 1, wherein said step of feeding said material comprises rotating said material at a rotational speed of about 1500 r.p.m. feeding said rotating material relative to said diamond tool at a feed rate of 0.01 mm/rev. and cutting said material to a cutting depth of about 0.01 mm.

6. The method of claim 1, wherein said length L is about 0.25 mm and said swept back amount t is about 0.35 μm.

* * * * *